United States Patent
Studinger

(10) Patent No.: US 11,412,747 B1
(45) Date of Patent: Aug. 16, 2022

(54) GAMBREL

(71) Applicant: James Paul Studinger, Bloomfield Hills, MI (US)

(72) Inventor: James Paul Studinger, Bloomfield Hills, MI (US)

( * ) Notice: Subject to any disclaimer, the term of this patent is extended or adjusted under 35 U.S.C. 154(b) by 20 days.

(21) Appl. No.: 17/157,446

(22) Filed: Jan. 25, 2021

(51) Int. Cl.
*A22C 15/00* (2006.01)

(52) U.S. Cl.
CPC .................................. *A22C 15/00* (2013.01)

(58) Field of Classification Search
CPC .................................................... A22C 15/00
USPC ............................................ 452/185, 187–192
See application file for complete search history.

(56) References Cited

U.S. PATENT DOCUMENTS

| | | | |
|---|---|---|---|
| 3,894,313 A * | 7/1975 | Miller | A22C 15/003 |
| | | | 452/187 |
| 4,615,077 A * | 10/1986 | Beebe | A22B 5/06 |
| | | | 452/187 |
| 5,304,091 A | 4/1994 | Wilkinson | |
| 5,487,700 A * | 1/1996 | Dillard | A22C 21/0007 |
| | | | 452/179 |
| 6,565,426 B2 | 5/2003 | Mayhew | |
| 6,974,374 B1 * | 12/2005 | Teinert | A22B 5/06 |
| | | | 452/191 |
| 8,016,648 B2 * | 9/2011 | Frederick | A22B 5/161 |
| | | | 452/132 |
| 8,210,912 B2 * | 7/2012 | Ugiansky | A22B 5/06 |
| | | | 452/187 |
| 8,708,314 B2 * | 4/2014 | Scott | A22B 7/002 |
| | | | 254/266 |
| 8,801,509 B2 * | 8/2014 | VerWys | A22B 7/002 |
| | | | 452/189 |
| 8,890,007 B2 | 11/2014 | Garner | |
| 11,160,284 B2 * | 11/2021 | Gundlach | A22C 15/005 |
| 2008/0139097 A1 | 6/2008 | Smick | |

* cited by examiner

*Primary Examiner* — Richard T Price, Jr.

(74) *Attorney, Agent, or Firm* — Carlson, Gaskey & Olds, P.C.

(57) ABSTRACT

A gambrel includes a frame including a fulcrum attachment. A first hanger is on a first lateral side of the frame. A second hanger is on a second lateral side of the frame. At least one line retainer is fixed relative to the frame.

20 Claims, 5 Drawing Sheets

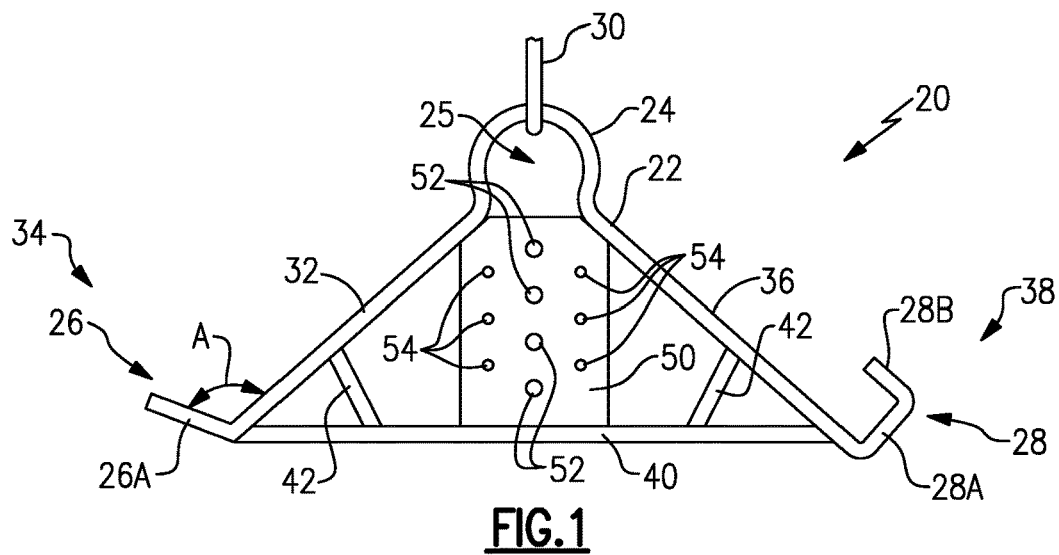

GAMBREL

BACKGROUND

The present disclosure relates to a portable device for hanging or dressing an animal and in particular, to a gambrel for hanging the animal.

Gambrels are commonly used for processing an animal by a butcher or a hunter, because a gambrel is used to lift, move or suspend an animal for dressing, typically by affixing the gambrel through the legs of the animal. A typical gambrel is suspended by a rope, tie, chain or other line, and used to separate the animal's hocks to allow easy access for quartering. Once quartered, the legs are removed from the gambrel.

SUMMARY

In one exemplary embodiment, a gambrel includes a frame including a fulcrum attachment. A first hanger is on a first lateral side of the frame. A second hanger is on a second lateral side of the frame. At least one line retainer is fixed relative to the frame.

In another exemplary embodiment, a gambrel includes a frame including a fulcrum attachment. A first hanger is on a first lateral side of the frame. A second hanger is on a second lateral side of the frame. A mounting structure includes a plurality of fastener openings for securing at least one line retainer.

In another exemplary embodiment, a method of operating a gambrel includes attaching a line to a fulcrum attachment on a frame of a gambrel. A height of the gambrel is adjusted relative to a support surface to a first height by positioning the line. The line is secured to a first line retainer fixed to the frame of the gambrel when the gambrel is positioned at the first height.

BRIEF DESCRIPTION OF THE DRAWINGS

The various features and advantages of the present disclosure will become apparent to those skilled in the art from the following detailed description. The drawings that accompany the detailed description can be briefly described as follows.

FIG. 1 illustrates an example gambrel.

FIG. 2 illustrates the example gambrel of FIG. 1 with a cleat.

FIG. 3 illustrates the example gambrel of FIG. 1 with a cam.

DETAILED DESCRIPTION

Figure 4:
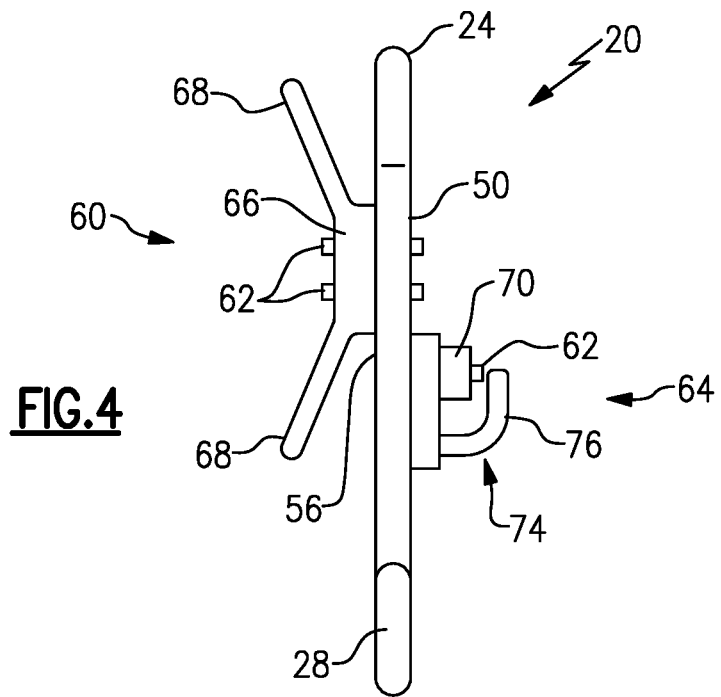
FIG. 4 illustrates a side view of the gambrel of FIG. 1 with the cleat on a front side and the cam on a rear side.

FIG. 1 illustrates an example gambrel 20 used for processing an animal 80 (FIG. 8), such as a deer. The gambrel 20 allows a user to access multiple sides of the animal 80 at a height that is convenient for the user. Because the gambrel 20 is attached to a line 30 about a hanging structure 21 (FIG. 8), the height of the animal 80 can be adjusted by manipulating the line 30.

In the illustrated example, the gambrel 20 includes a frame 22 defining a fulcrum 24 for pivoting the gambrel 20 and first and second hangers 26, 28 for attaching the animal 80 to the frame 22. The frame 22 generally extends in a single plate with the first hanger 26 located on a first lateral side 34 of the plane and the second hanger 28 located on a second lateral side 38 of the plane. The frame 22 is made from bending and/or welding various pieces of metal, such as steel rod, together to create the shape of the frame 22. However, the frame 22 could be made of other types of materials capable of supporting the weight of the animal 20.

The fulcrum 24 forms an attachment with the line 30 at a mid-portion and top of the frame 22 for pivoting the gambrel 20 during use. In the illustrated example, the fulcrum 24 includes a semi-circular piece of metal that defines an opening 25 for accepting the line 30 used to hang the gambrel 20. However, the fulcrum 24 could define other shapes for accommodating the line 30.

A first lateral support 32 extends from a first end of the fulcrum 24 towards the first hanger 26 on the first lateral side 34 of the frame 22. The first lateral support 32 is a straight piece and the first hanger 26 includes an arm 26A that extends from a distal end of the first lateral support 32 at an angle A. In one example, the angle A is between 110 and 160 and in another example, the angle A is between 120 and 150 degrees.

One feature of having the single straight arm 26A on the first hanger 26 is the ability for a single person to easily remove a body part of the animal 80 from the first hanger 26. In particular, the part of the animal 80 can be slid outward with little lifting force because the first hanger 26 does not include a retainer at a distal end like the second hanger 28. The arm 26A can be formed separately from the first lateral support 32 and later attached by welding. Alternatively, the arm 26A can be formed by creating a bend at the distal end of the first lateral support 32.

Figure 10:
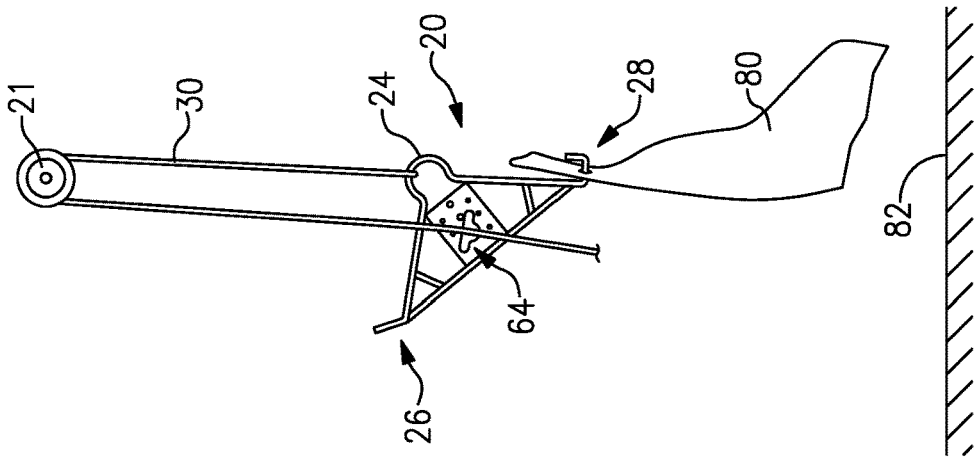
FIG. 10 illustrates the gambrel of FIG. 1 pivoted about a fulcrum with a pivotably mounted cam.

A second lateral support 36 extends from the fulcrum 24 towards the second hanger 28 on the second lateral side 38 of the frame 22. The second lateral support 36 is a straight piece and the second hanger 28 includes a first arm 28A that extends outward at approximately 90 degrees from the second lateral support 36 and a second arm 28B that extends in a direction generally parallel to the second lateral support 36 and in a direction of the fulcrum 24. However, the second hanger 28 could include a different shape, such as a curved shape, that includes a return portion extending in the direction of the second lateral support 36 towards the fulcrum 24. The second arm 28B or return portion secures a body part of the animal 80 to the frame 22 when the gambrel 20 rotates about the fulcrum 24 as shown in FIG. 10 to prevent the animal 80 from separating from the gambrel 20.

A cross-support member 40 extends between the first lateral support 32 and the second lateral support 36 on a bottom of the gambrel 20 opposite the fulcrum 24. In one example, opposite ends of the cross-support member 40 intersect the distal ends of the first and second lateral supports 32, 36 and the first and second hangers 26, 28, respectively. Additionally, support members 42 may connect the cross-support member 40 with a corresponding one of the first and second lateral supports 32, 36.

A mounting structure 50, such as a plate, is attached to a mid-portion of the frame 22. In the illustrated example, the mounting structure 50 is attached to the cross-support member 40 and the first and second lateral supports 32, 36 through a process such as welding. The mounting plate 50 includes elongated edges at corresponding intersections with the cross-support member 40 and the first and second lateral supports 32, 36 to provide additional contact area between the components in order to secure the mounting structure 50 to the frame 22 through welding.

The mounting structure 50 includes a first set of mounting holes 52 arranged vertically in a line through a center of the mounting structure 50. With the line defined by the mounting holes 52 being aligned with a center of the fulcrum 24 and an attachment point with the line 30. Multiple pairs of second mounting holes 54 are located on opposite sides of the first set of mounting holes 52. In the illustrated example, the first set of mounting holes 52 providing varying locations for mounting a cleat 60 (FIG. 2) to a first face 56 of the mounting structure 50 with fasteners 62, such as bolts, extending through the cleat 60 and the mounting structure 50. Similarly, the pairs of second mounting holes 54 are used to mount a cam 64 (FIG. 3) with the fasteners 62 on a second face 58 of the mounting structure 50. Therefore, in the illustrated example, a front side of the gambrel 20 includes the cleat 60 and a rear or back side of the gambrel includes the cam 64. However, the location of the cleat 60 and cam 64 could be reversed.

Figure 5:
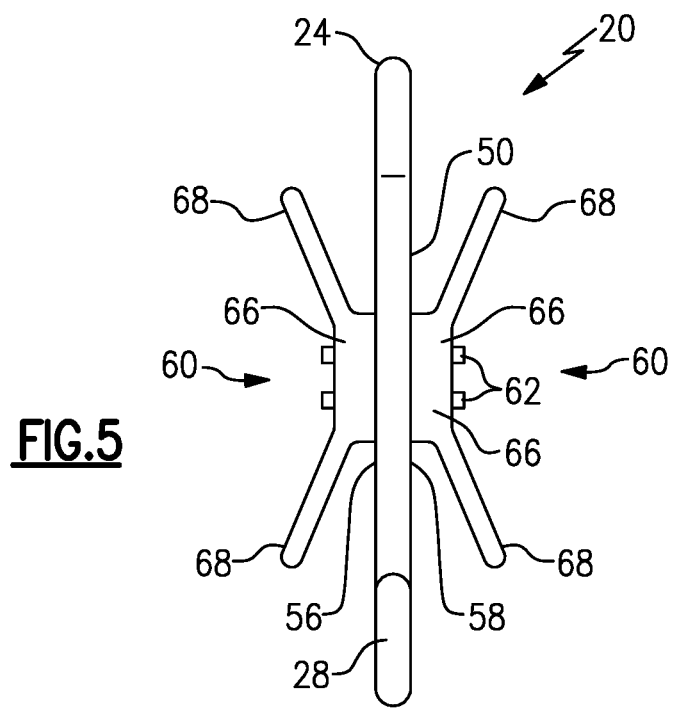
FIG. 5 illustrates the gambrel of FIG. 1 with a pair of cleats.
Figure 8:
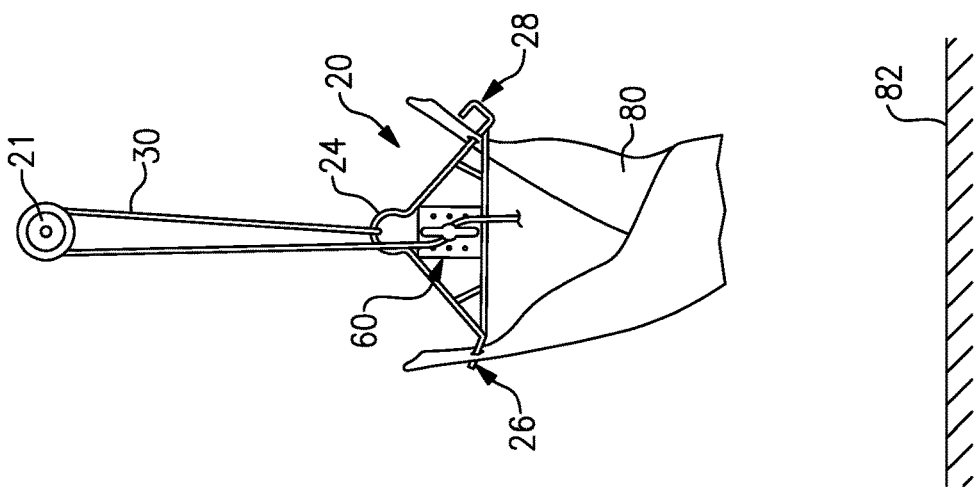
FIG. 8 illustrates the gambrel of FIG. 1 with the cleat at a first height.

As shown in FIGS. 2 and 4-5, the cleat 60 includes a central body 66 having a pair of fastener openings with a pair of oppositely extending arms or hooks 68. In the illustrated example, the hooks 68 extend in opposite vertical directions and away from the mounting structure 50. The cleat 60 is used to secure a portion of the line 30 relative to the gambrel 20 when positioning the gambrel 20 at a desired height as shown in FIG. 8. Alternatively, a second cleat 60 (FIG. 5) can be used in place of the cam 64 on the second face 58 of the mounting structure 50.

As shown in FIGS. 3 and 4, the cam 64 is attached to the mounting structure 50 with a pair of fasteners 62 through corresponding mounting holes 54. In the illustrated example, the cam 64 includes a pair of spring-loaded pawls 70 that are biased to close the gap between the two pawls 70. Opposing faces 72 of the pawls include a textured or ridged surface to improve engagement with the line 30 as it passes through a line passage 74 through the cam 64.

The line passage 74 is at least partially defined by the pawls 70, a line arm 76 and a body portion of the cam 64. As shown in FIGS. 3 and 4, the line arm 76 forms a loop that extends outward and vertically in front of the pawls 70. One feature of the line arm 76 is to maintain the line 30 in between the pawls 70 such that the pawls 70 can engage the line 30 without the line 30 separating from the cam 64. Additionally, the cam 64 can be pivotably mounted (FIG. 10) to the mounting structure 50 to allow the line passage 74 to remain generally aligned with the line 30. This can reduce sharp bends in the line 30 that increase friction and limit movement of the line 30 through the cam 64.

Furthermore, by locating the cam 64 in the second mounting holes 54 nearest a lower edge of the mounting structure 50, the user of the gambrel 20 has an improved angle for locking the line 30 into the cam 64. By using the second mounting holes 54 nearest the lower end of the mounting structure 50, the cam 64 is located adjacent or in contact with the cross-support member 40. Therefore, when the gambrel 20 is vertically out of reach of the user such that the cleat 60 cannot be reached without the assistance of a ladder or another raising structured, the cam 64 can fix or lock the line 30 relative to frame 22.

Figure 6:
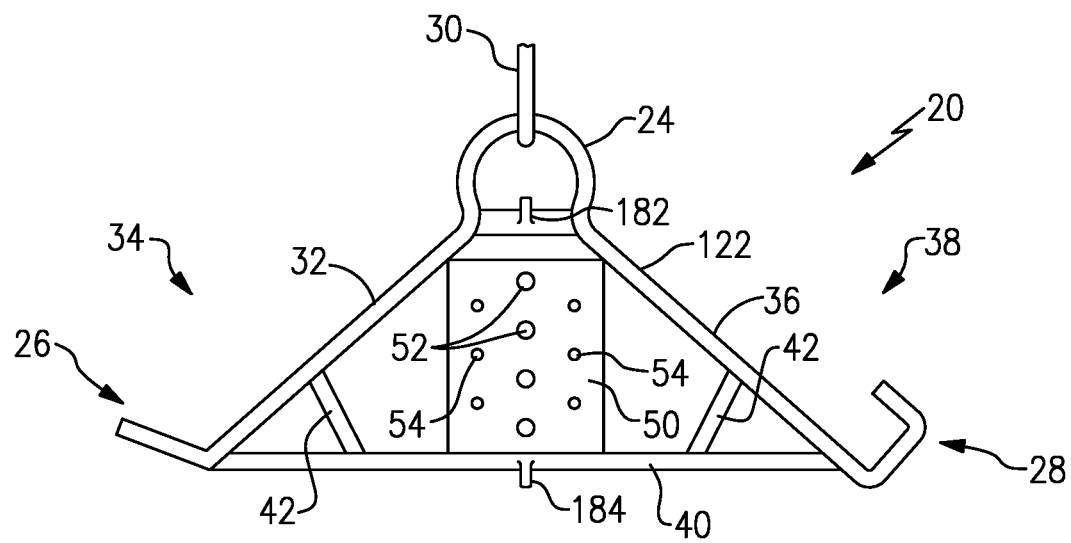
FIG. 6 illustrates a front view of another example gambrel.
Figure 7:
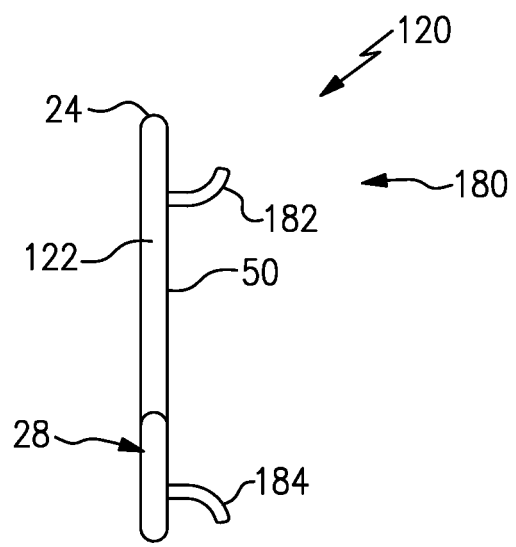
FIG. 7 illustrates a side view of the gambrel of FIG. 6.

FIGS. 6 and 7 illustrate another example gambrel 120. The gambrel 120 is similar to the gambrel 20 except where described below or shown in the Figures. Like numbers will be used for corresponding elements between the gambrel 20 and the gambrel 120 with new elements includes a leading 1. The gambrel 120 includes a frame 122 and incorporates any combination of the cleat 60 or the cam 64 described above with the addition of an integrated line retainer 180. The integrated line retainer 180 includes a first retention member 182 attached to the frame 122 adjacent the fulcrum 24 and a second retention member 184 attached to the cross-support member 40. The first and second retention members 182 and 184 curve outward and in opposite vertical directions to allow the line 30 to be wrapped around them and be secured similar to the cleat 60.

Figure 9:
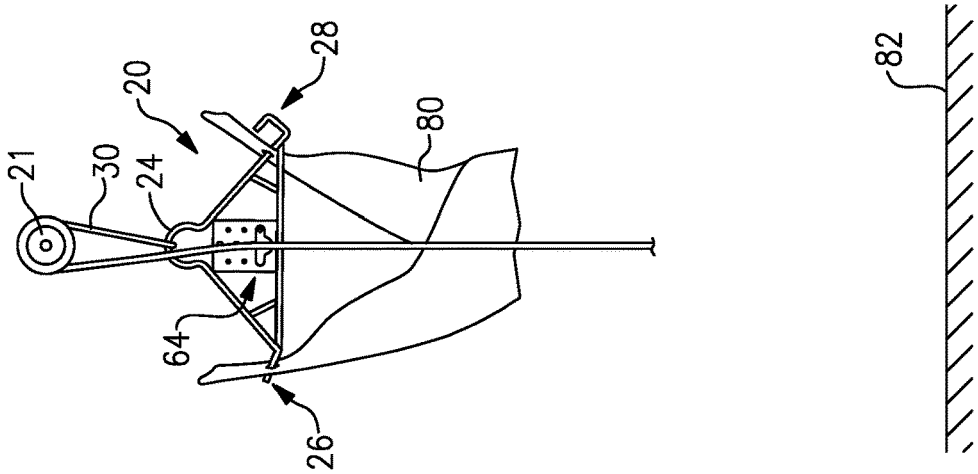
FIG. 9 illustrates the gambrel of FIG. 1 with the cam at a second height greater than the first height.

FIGS. 8-10 illustrate an example method of using the gambrel 20. One feature of the gambrel 20 or 120 is the ability to manipulate the gambrel 20, 120 by a single person as opposed to needing assistance from a second individual. As shown in FIG. 8, the gambrel 20 in a lowered position relative to a floor surface 82 with the line 30 attached to the fulcrum 24 and the cleat 60. However, the line 30 could be attached to the cam 64 in when the gambrel 20 is in the lower position. When the gambrel 20 is in the lower position, the user has improved access to the cleat 60 in order to wrap the line 30 around the cleat 60. The user can also user the integrated line retainer 180 when in the lower position.

However, when the gambrel 20 is raised in height as shown in FIG. 9, the user may not be able to reach the cleat 60 without the use of a ladder or other similar device. Therefore, the user may want use the cam 64 because it can lock the line 30 to the gambrel 20 when the gambrel 20 is vertically out of reach of the user. For example, when the line 30 is being pulled through the line passage 74 in between the pawls 70 (FIGS. 3 and 4), the line 30 can be locked between the pawls 70 without the user being at a similar height as the cam 64. If the user desires to lower the gambrel 20, the user can then pull the line 30 downward and outward away from the gambrel 20 to remove the line 30 from in between the pawls 70. The line arm 66 aids the user when using the cam 64 as it keeps the line 30 is close proximity to the pawls 70 and prevents the lien 30 from separating from the cam 64.

Furthermore, as shown in FIG. 10, the user can remove a portion of the animal 80 from the first hanger 26 and still have the remainder of the animal 80 be secured to the gambrel 20 because of the shape of the first and second arms 28A-B on the second hanger 28. Additionally, the cam 64 in FIG. 10 is pivotably mounted to the mounting structure 50 so that the line 30 remains straight through the line passage 74 on the cam 64. One feature of maintaining the line 30 straight through the line passage 74 is reduced frictional forces needed to pull the line 30 through the cam 64. After the remaining portion of the animal 80 is processed, it can be easily removed from the gambrel 20 as a much small portion of the animal 80 remains.

Figure 11:
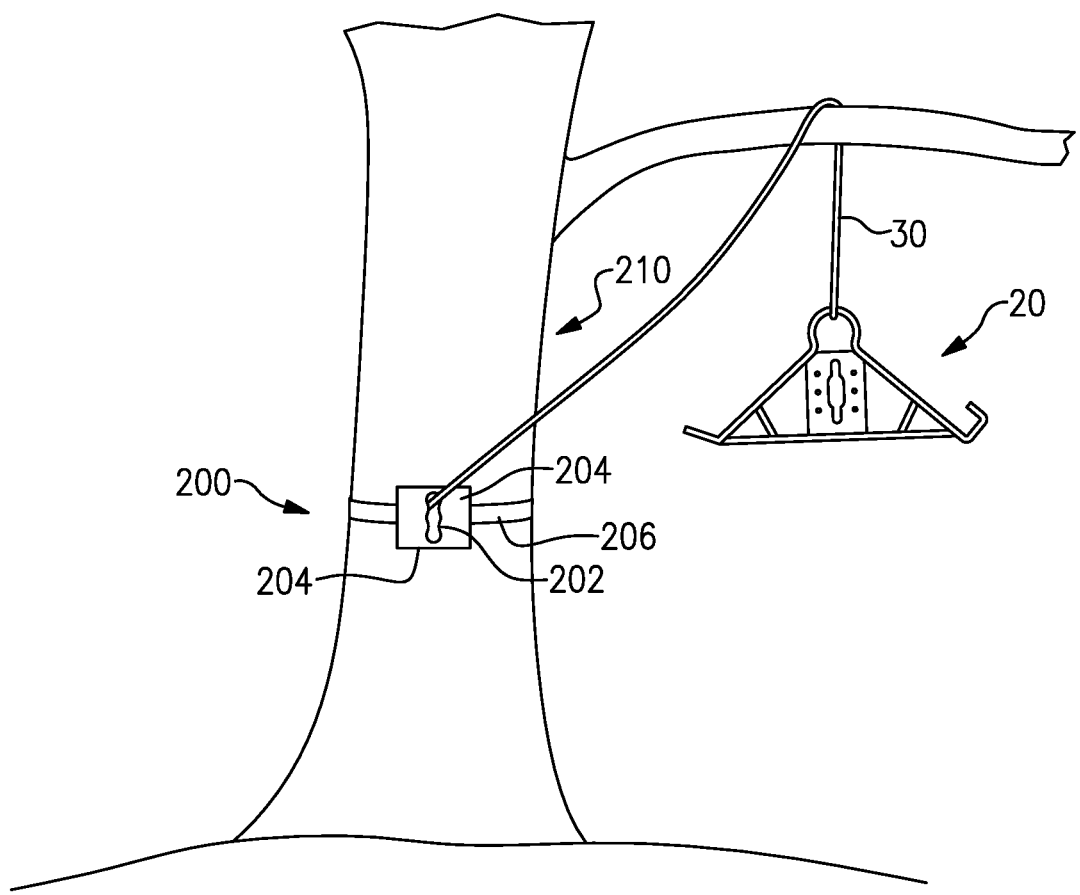
FIG. 11 illustrates a cleat harness attached to a structure.
Figure 12:
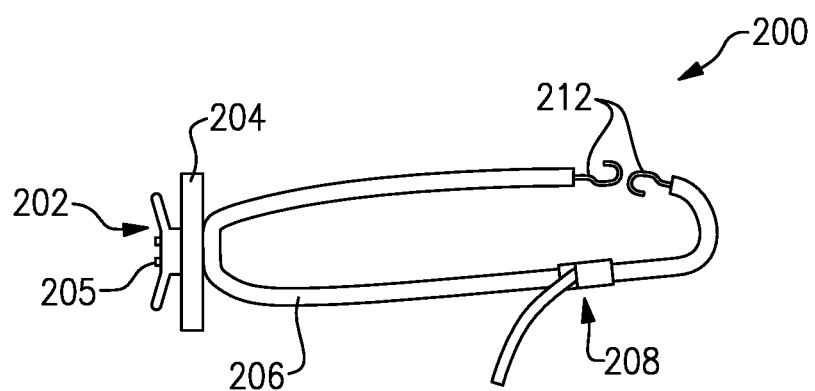
FIG. 12 illustrates a side view of the cleat harness of FIG. 11.

There may be some situations where a user may not want to use either the cleat 60 or the cam 64 attached to the gambrel 20 to secure the line 30. When this is the case, the gambrel 20 can be used with a cleat harness 200, as shown in FIGS. 11 and 12. The cleat harness includes a cleat 202, similar to the cleat 60, attached to a mounting plate 204 with fasteners 205. The mounting plate 204 can includes one of wood, metal, or flexible rubber material. A harness 206 is fixedly secured to the mounting plate 204. The harness 206 also includes a latch 208, such as a ratcheting mechanism or a cam mechanism, with hooked ends 212. The latch 208 allows the harness 206 to have a varying diameter for tightening to a mounting structure 210, such as a tree. The latch 208 can also provide compressive force against the mounting structure 210 to further secure the cleat harness 200 to the mounting structure. By using the cleat harness 200, the line 30 can be secured to position the gambrel at a desired height in a faster and more secure manner than is traditionally done by wrapping the line multiple times around the mounting structure 210.

Although the different non-limiting examples are illustrated as having specific components, the examples of this disclosure are not limited to those particular combinations. It is possible to use some of the components or features from any of the non-limiting examples in combination with features or components from any of the other non-limiting examples.

It should be understood that like reference numerals identify corresponding or similar elements throughout the several drawings. It should also be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claim should be studied to determine the true scope and content of this disclosure.

What is claimed is:

1. A gambrel comprising:
   a frame including:
      a fulcrum attachment;
      a first hanger on a first lateral side of the frame; and
      a second hanger on a second lateral side of the frame;
   at least one line retainer fixed relative to the frame.

2. The gambrel of claim 1, wherein the at least one line retainer includes a first cleat having a pair of oppositely extending hooks extending from a central body.

3. The gambrel of claim 2, including a fastener located in at least one fastener opening in the central body of the first cleat for securing the at least one cleat to the frame.

4. The gambrel of claim 2, wherein the at least one line retainer includes a cam located on a second side of the frame opposite the first cleat on a first side of the frame.

5. The gambrel of claim 4, including a plate attached to the frame having at least one cam fastener opening for accepting a cam fastener to secure the cam relative to the frame.

6. The gambrel of claim 4, wherein the cam includes at least one pivoting head and a line arm forming a line passage being at least partially defined by the at least one pivoting head and the line arm.

7. The gambrel of claim 1, wherein the at least one line retainer includes a first cleat located on a first side of the frame and a second cleat located on a second side of the frame opposite the first side.

8. The gambrel of claim 1, wherein the frame includes a first lateral support extending from the fulcrum attachment to the first hanger and the first hanger includes a single hanger arm that extends from the first lateral support at an angle between 120 degrees and 150 degrees.

9. The gambrel of claim 8, wherein the frame includes a second lateral support extending from the fulcrum attachment to the second hanger and the second hanger includes a first straight segment extending from the second lateral support and a second straight ember extending from a distal end of the first straight segment in a direction generally parallel to the second lateral support of the frame and a cross support extending between the first lateral support and the second lateral support and spaced from the fulcrum attachment.

10. The gambrel of claim 1, wherein the frame includes a first lateral support extending from the fulcrum attachment to the first hanger and a second lateral support extending from the fulcrum attachment to the second hanger and a cross support extending between the first lateral support and the second lateral support with the cross support spaced from the fulcrum attachment and adjacent the first hanger and the second hanger.

11. The gambrel of claim 10, wherein the at least one line retainer includes a first projection extending from the cross support and a second projection fixed relative to the frame adjacent the fulcrum attachment.

12. The gambrel of claim 1, forming an assembly with a cleat harness including a cleat attached to a harness having a ratchet for varying a size of the harness.

13. A gambrel comprising:
   a frame including:
      a fulcrum attachment;
      a first hanger on a first lateral side of the frame,
      a second hanger on a second lateral side of the frame; and
      a mounting structure including a plurality of fastener openings for securing at least one line retainer.

14. The gambrel of claim 13, wherein the at least one line retainer includes a first cleat located on a first side of the frame and a second cleat located on a second side of the frame opposite the first side.

15. The gambrel of claim 13, wherein the at least one line retainer includes a first cleat located on a first side of the mounting structure and a cam located on a second side of the mounting structure.

16. The gambrel of claim 13, forming an assembly with a cleat harness including a cleat attached to a harness having a ratchet for varying a size of the harness.

17. The gambrel of claim 13, wherein the frame includes a first lateral support extending from the fulcrum attachment to the first hanger and a second lateral support extending from the fulcrum attachment to the second hanger and a cross support extending between the first lateral support and the second lateral support with the mounting structure engage the first lateral support, the second lateral support, and the cross support.

18. A method of operating a gambrel comprising:
   attaching a line to a fulcrum attachment on a frame of a gambrel;
   adjusting a height of the gambrel relative to a support surface to a first height by positioning the line; and
   securing the line to a first line retainer fixed to the frame of the gambrel when the gambrel is positioned at the first height.

19. The method of claim 18, wherein the first line retainer includes one of a cleat or a cam fixed relative to the frame.

20. The method of claim 19, including:
   adjusting a height of the gambrel relative to the support surface by positioning the line; and
   securing the line to a second line retainer fixed relative to the frame of the gambrel when the gambrel is positioned at a second height.

* * * * *